Jan. 13, 1970   F. MASSA   3,489,994
LINE HYDROPHONE
Filed Oct. 3, 1967   3 Sheets-Sheet 2
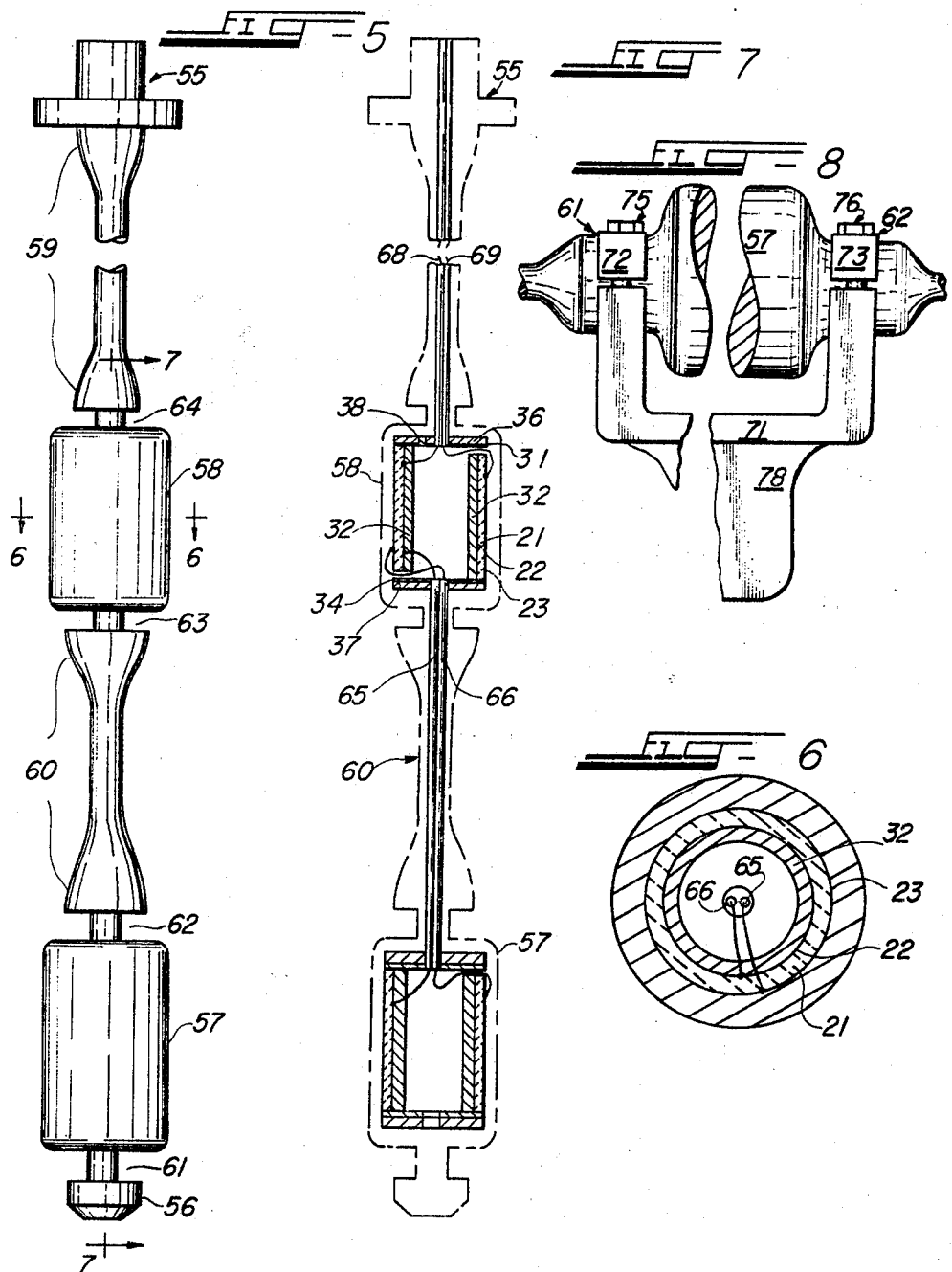
INVENTOR
FRANK MASSA
BY Louis Bernat
ATTY

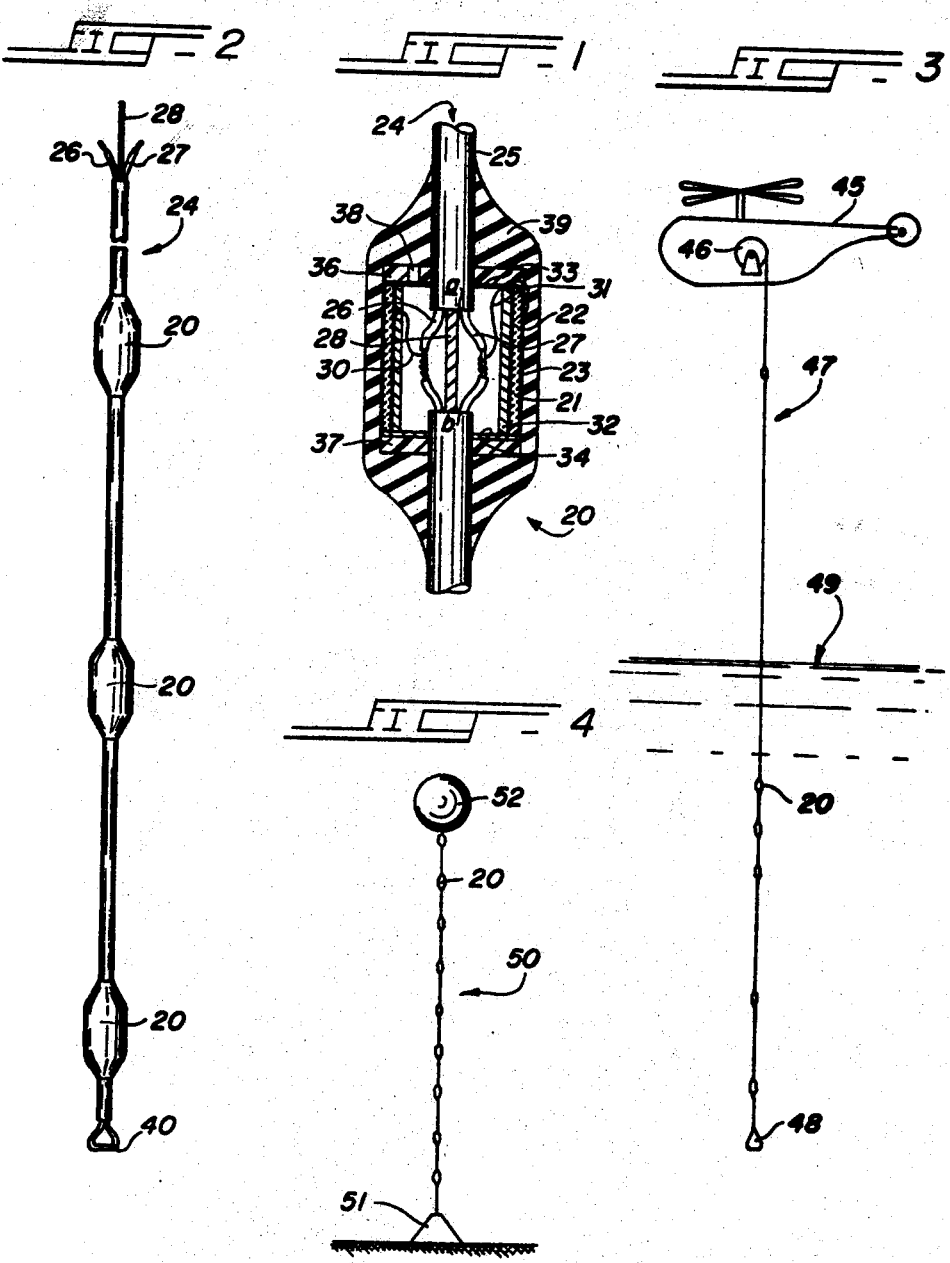

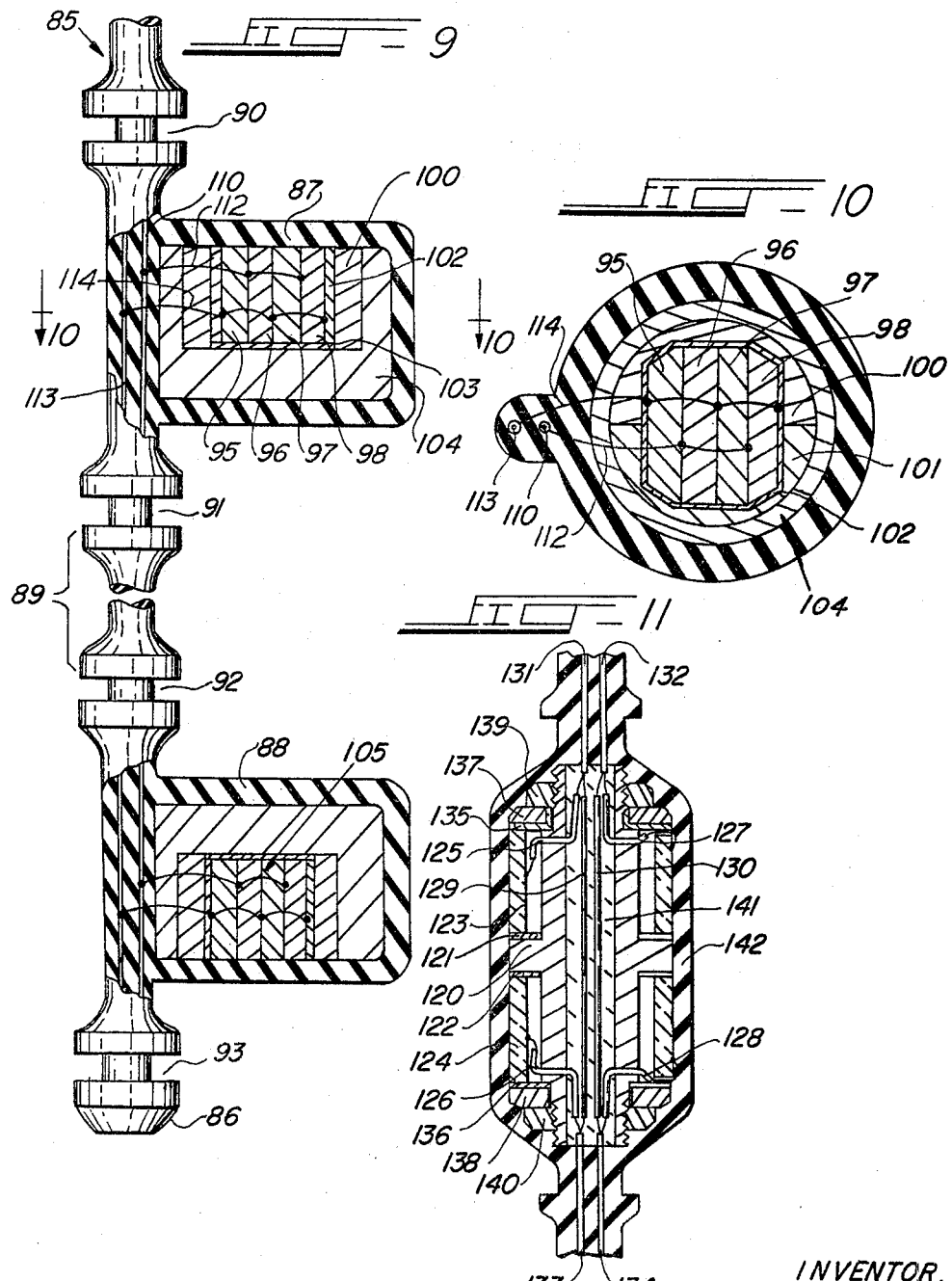

United States Patent Office 3,489,994
Patented Jan. 13, 1970

3,489,994
LINE HYDROPHONE
Frank Massa, Cohasset, Mass., assignor to Dynamics Corporation of America, Massa Division, Hingham, Mass.
Continuation-in-part of application Ser. No. 626,149, Mar. 27, 1967. This application Oct. 3, 1967, Ser. No. 672,582
Int. Cl. H04b 13/00
U.S. Cl. 340—9    14 Claims

ABSTRACT OF THE DISCLOSURE

A plurality of hydrophones are distributed along a cable somewhat as beads might be distributed along the string of a necklace. A first embodiment of the invention includes a number of hydrophones coaxially attached to a rugged, rubber-jacketed, electrical cable including a steel-strain cable or the equivalent. This embodiment provides special advantages when the line hydrophone must withstand great stresses, as when it is deployed into deep water from a hovering helicopter, for example. A second embodiment of the invention is manufactured by a continuous molding process. This embodiment enables the selection of any one of a wide variety of waterproof jacket materials, eliminates splices in the jacket, and simplifies equipment used for mounting attachments onto the cable. A third embodiment uses matched pairs of hydrophones connected in opposition in order to generate bucking voltages which cancel noise generated by the hydrophone responsive to vertical line motion. This noise cancellation has practically no effect upon detection of vibrations appearing in ambient sound fields.

---

This is a continuation-in-part of my earlier co-pending application Ser. No. 626,149, filed Mar. 27, 1967, now Patent No. 3,418,624, entitled "Coaxially Mounted Line Hydrophone" and assigned to the assignee of this invention.

This invention relates to line hydrophones for use in directional underwater sound receiving and transmitting apparatus.

A "line hydrophone" assembly generally comprises a length of cable having a suitable number of hydrophone transducer elements attached thereto and spaced along a length thereof. Each hydrophone element is a device for converting any sound waves appearing in the water into corresponding electrical signals which may be processed in any known manner. Or, conversely, the hydrophone element may convert electrical signals into corresponding sound waves which are transmitted into the water. This use of such a line array of hydrophone elements produces a vertical beam that discriminates against surface water noise and thus improves the listening range of the hydrophone.

Those skilled in the art already know of many applications for line hydrophone assemblies. For example, they may be deployed into deep water from a hovering patrol helicopter which is "listening" for submerged submarines. They may be deployed to generate sound energy which is transmitted from the hydrophone elements into the water, as to provide underwater telephony, for example. Still other uses and applications will readily occur to those skilled in the art.

Generally, the line hydrophone assembly is wound on a motor operated reel. This way, it is a very simple matter to deploy the line into the water or to raise it out of the water by operating the motor to wind or unwind the reel. A long and rugged line permits the hydrophone elements to be lowered into very deep water where it is easier to make a long range sonic contact. Thus, for example, an operator in a hovering helicopter may quickly and easily deploy an extremely long length of line, pull it in, and then redeploy it in a new location. In other installations, the problems may be totally different. For example, the line may not have to support such a great weight, but the hydrophones may be so numerous and so close together that it is not practical or desirable to make a cable splice at each hydrophone. Or, other installations may involve a vertical jiggling of the line which tends to generate noise.

Heretofore, the hydrophone elements have been attached to short lengths of wire which are spliced to the cable that is raised and lowered. This array of dangling hydrophones caused many problems, for example, the splices, wires, and cable cast "shadows" in the sonic energy falling on the hydrophones. Also, the dangling hydrophone elements tended to become entangled when the cable was reeled in and out. Thus, as a practical matter both the usefulness and the life of the hydrophone has suffered.

Accordingly, an object of this invention is to provide new and improved line hydrophones. More particularly, an object is to provide a hydrophone structure having a number of extremely sensitive transducer elements spaced along a length of cable.

An object is to provide line hydrophones having a full 360° sound field, free of shadow zones. Here, an object is to provide supporting structures which offer minimum obstruction in the sound field adjacent the hydrophone elements.

A further object is to provide a cable which may be deployed at very high speeds with virtually no danger of damage to or entanglement of the hydrophone elements. More particularly, an object is to provide hydrophone elements coaxially mounted on the cable itself so that the elements and cable form an integrated unit. In this connection, an object is to mold the hydrophone elements to the cable with a covering of watertight, sound transmitting, elastomer material.

Still another object is to provide a rugged, multi-element, line hydrophone from a number of cylindrical, piezoelectric shells assembled as "beads" spaced along and molded into a completely waterproof cable assembly.

Yet another object is to provide a line hydrophone capable of withstanding continuous immersion in a hostile environment, such as salt water, during very long periods of time. Here an obect is to eliminate splices in the waterproof jacket surrounding the line hydrophone. Another object is to enable the selection of virtually any waterproof material which may be well adapted to form the waterproof jacket required by a particular installation and environment.

A further object is to provide line by hydrophones adapted to discriminate against noise resulting from a vertical jiggling of the line.

For a better understanding of how the invention accomplishes these and other objects, reference may be made to the attached drawings, in which:

FIG. 1 is a cross-sectional view of a single hydrophone element constructed according to the teaching of this invention;

FIG. 2 is a perspective view of a first embodiment of the invention featuring a line hydrophone assembly supported by a strain cable wherein a number of the elements shown in FIG. 1 are assembled as "beads" spaced along a cable;

FIG. 3 illustrates an application of the invention to an underwater detection system;

FIG. 4 illustrates a second application of the invention to a hydrophone system moored to the bottom of the ocean;

FIG. 5 is a perspective view of a second embodiment of the invention wherein a number of closely spaced hydrophone elements are molded into a continuous waterproof jacket;

FIG. 6 is a cross-sectional view of a hydrophone element taken along line 6—6 of FIG. 5;

FIG. 7 is a longitudinal cross-sectional view of two hydrophone elements taken along line 7—7 of FIG. 5;

FIG. 8 is a plan view which shows how a bracket may be attached to an element in the line hydrophone of FIG. 5;

FIG. 9 is a perspective view (in partial cross-section) of a third embodiment of the invention which is especially well adapted to discriminate against noise caused by a vertical jiggling of the line hydrophone in the water;

FIG. 10 is a cross-sectional view of a hydrophone element taken along line 10—10 of FIG. 9; and FIG. 11 is a sectional view of a transducer portion of a dual hydrophone element which shows how a coaxial design may be constructed to discriminate against noise caused by axial mechanical vibration of the line assembly.

This election to show exemplary constructions, uses, and applications for various embodiments of complete line hydrophone assemblies should not be taken as a restriction upon the invention. Quite the contrary, the novel features of the invention are set forth in the appended claims which are to be construed broadly enough to cover all equivalents falling within the true scope and spirit of the invention.

In the first embodiment (FIGS. 1 and 2) of my invention, the hydrophone element 20 includes a cylindrical transducer element 21. While element 21 may be made from a number of different materials, I prefer to use a cylindrical shell of polarized ceramic material such as barium titanate or lead zirconate titanate. The inner and outer cylindrical surfaces of this shell are covered with metallic electrode surfaces 22 and 23, respectively.

The ceramic shell (with its electrodes) is coaxially mounted on a cable 24 comprising an outer, waterproof jacket 25, a pair of electrically conductive insulated wires 26 and 27, and a strain cable 28. The waterproof jacket 25 is removed inside the ceramic shell (as indicated at a, b) to expose the electrical wires 26 and 27. These wires are stripped of their insulation to permit the completion of electrical connections between the inner and outer electrodes 22, and 23 via leads 30 and 31, respectively. Upon reflection, it should be obvious that the wires 26 and 27 and leads 30 and 31 complete the electrical circuit required to supply the line hydrophone, and the strain cable 28 supports the weight of the entire assembly.

Means are provided for making the hydrophone elements rugged and waterproof. In greater detail, a thin layer of a low acoustic impedance, pressure release material 32 is bonded to line the entire inner wall of the ceramic cylinder 21. Then, disks 33 and 34 of the same pressure release material are fitted over the ends of the cylinder. While any suitable material may be used to provide this pressure release lining, I prefer to use a mixture of cork and rubber of the type sold under the trademark "Corprene." Any suitable cement may be used to bond this material to the ceramic.

After the "Corprene" disks 33 and 34 are in place, end caps 36 and 37 are cemented by any suitable adhesive to the two ends of the ceramic cylinder 21. I prefer to use either Bakelite or metal for the end plates; however, I do not consider this critical. One of the end caps (here 36) contains a hole 38 through which a potting compound (such as epoxy) is poured. This compound, 41, should completely fill the entire cylindrical space inside the transducer to prevent the leads 30 and 31 from vibrating and to lock the cylinder in place around the cable.

Finally, a sound transparent jacket or layer 39 of material, such as rubber, is molded over the outer surface of the ceramic cylinder 21. To facilitate deployment of the line hydrophone without danger of entanglement and to enhance appearance, the molded jacket should have a smooth and contoured shape tapering from each end of the relatively large diameter of the cylinder 21 to the relatively small diameter of the cable 24. Of course, the bond between the cable jacket 25 and transducer jacket 39 should be completely waterproof when the hydrophone is lowered to the deepest depth at which it may be used.

As shown in FIG. 2, a number of the hydrophone elements 20 may be asembled as "beads" spaced along the cable 24. The cable 24 is completely flexible, and the hydrophone elements are relatively short so that they do not seriously interfere with the flexibility. The insulated electrical wires 26 and 27 and the strain cable 28 are shown emerging from the top of the cable 24. They run through the entire length of the assembly. The strain cable also emerges at the bottom of the line hydrophone where it is formed into a loop 40. By inspection, it should be obvious that the cable 24 passes through the center line of the hydrophone elements 20—which is why they are described herein as being "coaxially mounted."

The strain cable 28 acts as a continuous tension member for supporting the full length of the entire cable and hydrophone elements. The upper end 28 may be attached to anything for lifting the cable, and a weight or anchor may be attached to the loop 40. This way the assembly is held tautly in a vertical position.

The entire assembly, shown in FIG. 2 and described above is herein called a "line hydrophone." This assembly results in a very rugged structure which may be wound onto drums as the cable is deployed and thereafter reeled-in. Since the hydrophone elements are integral with the cable, they may be reeled without any danger of damage. Also, there are no loose and dangling parts which may become entangled or move about in the water to cause noise. Moreover, the cables, splices, and wires are inside the transducer elements so that they do not cast shadows in the sound waves falling on the transducers.

Those who are skilled in the art may find many occasions to use this embodiment of the inventive line hydrophone. However, so that the disclosure may be complete, it may be well here to mention a few such uses. Thus, FIG. 3 shows a hovering helicopter 45 which has a motor driven reel 46 therein. The helicopter 45 is here shown as having lowered the line hydrophone 47 so that its weighted end 48 hangs deep under the surface 49 of the ocean. The spaced array of hydrophone elements 20 are near the lower weighted end of the cable. With the line hydrophone thus deployed, the helicopter can acommplish long range underwater sonic detection.

Because the weighted end 48 acts as a sinker to keep the line vertical and taut, and because of the transducer construction, there is a maximum sensitivity in the horizontal plane extending outwardly in all directions at right angles to the axis of the line. There is a minimum sensitivity along the vertical axis. Thus, the system discriminates against surface water and helicopter noise.

The application in FIG. 4 shows the line hydrophone 50 as anchored to the bottom of the ocean at 51. A buoy 52, having positive buoyancy creates a sufficient vertical tension to tautly extend the entire cable upwardly.

FIGS. 5–8 show a further embodiment of the invention wherein the entire assembly is covered by a unitary molded jacket in order to enable a use of any of a wide range of materials. This particular embodiment can, of course, be used under any suitable conditions. However, it has particular utility when the hydrophones are closely spaced along the length of a cable and when the assembly is used in connection with other equipment requiring a close mechanical association with the hydrophones. For example, sometimes each of the hydrophone elements is secured to a mechanical bracket which is part of such equipment.

In greater detail, this embodiment includes a line hydrophone terminated at one end in a connector 55 and at the other end a solid knob or an anchor cap 56. Distributed along the length of the line between the connector 55 and the anchor cap 56 are any convenient number of hydrophone elements 57 and 58. The spacing between these hydrophone elements is irrelevant; however, this particular embodiment of the invention might find a greater utility when it is necessary to space the hydrophone elements relatively close together. The hydrophone elements 57 and 58, the connector 55, and the anchor cap 56 are separated from each other by short interconnecting cable sections (such as 59 and 60) of any convenient length.

The connector 55 may be made in any suitable form. At one extreme, it could be merely the exposed ends of two wires which are to be soldered to any other suitable equipment. At the other extreme, it could, for example, be any of the many known connector devices, such as an arrangement shown in my co-pending application entitled "Underwater Separable Connector" Ser. No. 660,328, filed Aug. 14, 1967, and assigned to the assignee of this invention.

The anchor cap 56 is any suitably shaped enlargement or knob of material adjacent an undercut section 61 of reduced diameter, as compared with the diameter of cap 56. Suitable mounting brackets (not shown) may be clamped around sections 61–64, in order to attach the line hydrophone in a desired position in an array.

The individual hydrophone elements 57 and 58 are essentially the same as those shown and explained in connection with FIG. 1. Therefore, the same reference numerals are used to identify similar parts in FIGS. 1, 6 and 7. However, in the embodiment of FIGS. 5–8, I do not use a conventional rubber jacketed cable to interconnect the hydrophone elements. Instead, I use any convenient insulated wires or conductors 65 and 66 which are cut to the desired length and then used to interconnect the hydrophone elements 57 and 58. More particularly, these short lengths of wire are soldered at either end to the inner and outer electrodes 22, 23 on the ceramic cylinders of adjacent hydrophones. For example, FIG. 7 shows that the wires 65 and 66 are used to electrically interconnect similarly related electrodes on the hydrophones 57 and 58. The wires 68 and 69 extend the hydrophone connections to other hydrophone elements (not shown) or, ultimately, to the connecter 55.

After the hydrophone line is assembled into a complete electrical unit, as by the wires 65, 66, 68 and 69, the entire assembly is covered by a suitable acoustically transparent material, such as uncured or crude butyl rubber. The manner of doing this is irrelevant; the uncured rubber could be in the form of a tape which is wrapped around the array. Or pre-formed shell-like sections of crude rubber could be fitted around the array. Then, the entire unit is placed in a mold for conventional processing, during which the rubber is cured and formed into the general shape which is disclosed in FIG. 5. If the electrical assembly is too long to mold in a single operation, the waterproof jacket is molded around a convenient number of hydrophone elements. Then, the assembly is relocated in the mold and the process is repeated to mold a continuation of the jacket around the next groups of hydrophone elements. Preferably, the molding process is interrupted about the midpoint of an interconnecting section, such as 60. To achieve a reliable mechanical joint at the point of interruption, the two molded sections are joined by a step of reduced diameter so that subsequent molding operations provide an overlapping stepped bond to assure a completely waterproof seal. The undercut regions 61–64 may also be used to facilitate an alignment of the parts of the assembly during successive molding operations.

The decisions of whether to use uncured rubber in the form of one or several pre-formed shapes, or simply a tape wrapping, or whether to mold in a single step or a succession of steps are primarily matters of production convenience. It is only essential that the entire assembly is enclosed in a waterproof jacket after the process is completed.

The undercut sections or grooves 61–64 provide regions which enable the user to make convenient mechanical connections between the line hydrophones and other equipment. These undercut regions provide a distinct advantage since the grooves form clamping areas which eliminate the rubber grommets often used heretofore to keep the mechanical brackets from chafing the cable jacket 50.

While the bracket may take any of many forms, FIG. 8 shows one convenient device, by way of example only. More specifically, a bifurcated bracket 71 spans the hydrophone element 57, and its ends are provided with semi-circular recesses which fit into the undercut grooves 61 and 62. A pair of bracket elements 72 and 73 also has semi-circular recesses which fit into the grooves 61 and 62 and against the ends of the bracket 71. Then, suitable fastening means 75 and 76 secure the bracket parts 71–73 together and firmly affix them to the hydrophone element 57. The bracket 71 includes a tongue 78 which may be attached in any convenient manner to any other suitable equipment.

One of the advantages of this embodiment is that the entire jacket is a continuous waterproof unit, completely devoid of splicing and bonding. This is especially valuable when the hydrophone elements are closely spaced and when the line hydrophone must be submerged in a hostile environment during extremely long periods of time. Moreover, there is a very wide choice of material which may be useful for the jacket. Thus, the construction may be adapted to the environment in which it is used.

Yet another embodiment of the invention, shown in FIGS. 9 and 10, is used when the line hydrophone experiences noise as a result of vertical motion, as when the line is jiggled, for example. Here, the arrangement is such that these noises generate approximately equal and opposite voltages which buck each other to cancel the noise on the line.

Preferably, the line hydrophone of FIGS. 9 and 10 is made by a molding technique similar to that described above in connection with the embodiment of FIGS. 5–8. Here again, a line hydrophone extends from a connector (not shown) at 85 to an end cap 86 at the bottom of the line. Distributed along the length of this line are a number of hydrophone elements 87 and 88 separated by interconnecting line sections 89 of any convenient length. Again, a suitable number of undercut regions 90–93 are also distributed along the length of the line hydrophone in order to facilitate an interconnection between the hydrophones and mechanical equipment used in association therewith.

As here shown, each of the hydrophone elements of FIGS. 9 and 10 use polarized plates of piezoelectrical material mounted in rigid housings somewhat in the manner described in my U.S. Patent No. 2,613,261, granted Oct. 7, 1952 and entitled "Underwater Transducer."

In this arrangement, an assembly of piezoelectric plates 95–98 are stacked together and bonded to a base portion of the housing. These plates are acoustically isolated from the side wall of the housing. While many different types of materials may be used to make these plates, they might be made from 45° Z-cut ADP crystals. Unlike the embodiments of FIGS. 1 and 6, the resulting piezoelectric structure is not cylindrical. Therefore, to form the desired cylindrical shape, a pair of rigid, semi-cylindrical shells 100, 101 are provided with an interior contour which exactly matches the contour of the stack of piezoelectric plates 95–98. When the shells 100, 101 are fitted together around plates 95–98, the external contour is a true cylinder. The shells 100, 101 may be separated from the piezoelectric plates 95–98 by a thin layer of low-acoustic-impedance material 102.

A somewhat cup shaped, rigid housing 104 is made from any suitable rigid material. The outer contour of housing 104 is cylindrical. The inner contour conforms to the outer contour of the assembled shells 100 and 101. The bottom of the housing 104 is closed and the top is open. Thus, when the piezoelectrical plates 95–98 and their shells 100, 101 are forced into the opening at the top of housing 104, only one end face of the crystal assembly remains exposed to activation from the surrounding sound field. The sides of the piezoelectric stack of elements are, thus, completely surrounded by a thin film 102 of low-acoustic-impedance material clamped in place by a rigid outer shell and housing combination 100, 101 and 104. Preferably, the thickness of film 102 is accurately controlled, and the various dimensions are selected to apply a slight compression to the film for completely filling the entire space between the piezoelectric material and the shell 100, 101.

The surface of the piezoelectric stack 95–98 which comes into contact with the bottom of the housing 104 is machined to form a plane surface and then that surface bonded in place by any suitable cement. A thin disk of rigid insulating material 106 may be cemented to the surface of the housing 104 as shown before cementing the assembled crystal stack to the bottom of the housing.

The positive conductor 110 of the line hydrophone cable is connected via wire 112 to two alternate ones of the inside surfaces of the piezoelectric plates 95–98, as shown in FIGS. 9 and 10. The negative hydrophone conductor 113 is connected via wire 114 to the remaining three surfaces of the piezoelectric stack 95–98 (i.e. the two outside surfaces and the central surface), again as shown in FIG. 9. After the electrical connections to all the crystal assemblies are completed, a waterproof jacket is molded around it, as described above in connection with FIG. 5.

In keeping with an aspect of the invention, the hydrophones are used in matched pairs arranged with their exposed ends facing in opposite directions. For example, FIG. 9 shows that the end of the piezoelectric stack 95–98, which is exposed to the surrounding sound field, is pointed upwardly toward the top of the hydrophone element 87. A similar matched stack of piezoelectric plates 105 is arranged so that its exposed end points downwardly toward the bottom of hydrophone element 88.

In operation, generally axial mechanical vibrations imposed on the line hydrophone cause opposite voltages within the two hydrophone elements 87 and 88. That is because the upward acceleration of the line causes a compression force on the up-facing hydrophones and a tensile force on the bottom facing hydrophones. Therefore, the hydrophone elements 87 and 88 generate approximately equal and opposite electrical signals due to axial vibrations of the line and thereby cancel the noise voltage generated by the vibration. The ambient sound field does not cause such a bucking voltage. All sound fields generated voltages at each hydrophone element are additive. Thus, the matched pairs do not interfere with normal hydrophone operations but merely cancel the noise generated voltages due to axial mechanical vibration or jiggling of the cable.

It should now be fairly obvious that, as long as an even number of hydrophone elements are used in matched pairs there is a cancellation of noise resulting from random vertical line motion. However, there are times when it is inconvenient to use an even number of matched hydrophone elements. Without correction, this would leave a net unbalance of noise produced signals, and that unbalance would tend to partially defeat the noise cancelling feature invention. To avoid this contingency I may provide a double hydrophone element at each location which would consist of a pair of crystal and housing assemblies mounted with their base surfaces back to back at each location prior to molding the rubber jacket over the composite assemblies. The double hydrophone construction cancels the mechanical noise voltages at each station instead of depending on separated matched pairs as previously described.

The principle of FIGS. 9 and 10 may be used with other forms of transducer elements. For example, the stack of piezoelectric plates 95–98 could be replaced by polarized ceramic plates arranged to generate voltages transverse to the axis of the applied acoustic signal. Or, other types of crystals (such as lithium sulphate) or polarized ceramic could be made in the form of disks and be stacked within the housing 104 to generate voltages in the thickness mode of vibration, as is well known in the art.

In FIG. 11 is shown another variation for cancelling the mechanically generated noise voltages in a coaxial hydrophone design having the same general configuration of the structures illustrated in FIGS. 1–4. A rigid tubular support member 120 shown in cross section is provided with a shoulder and threads at each end as illustrated. Thin washers of rigid insulating material 121 and 122 are cemented to opposite faces of the center portion of the tubular member and an identical polarized ceramic cylinder 123 and 124 is cemented over each insulating washer as shown. Insulated electrical conductors 125–128 are soldered to the inner and outer electrode surfaces of the ceramics as shown and each of the conductors passes through a clearance hole into the center opening of the tubular member 120. An insulated conductor 129 is electrically connected to the leads 125 and 126 and a conductor 130 is connected to the leads 127 and 128 as illustrated. Insulated conductors 131–134 are connected as illustrated and extend into the neighboring element assemblies (not shown) to interconnect all the elements to be assembled into a line hydrophone. A thin corprene washer 135 is cemented to the open end of the ceramic cylinder 123 and a similar corprene washer 136 is cemented to the open end of the ceramic cylinder 124. A rigid washer 137 which may preferably be of electrical insulating material is placed over the corprene washer 135 and a nut 139 is tightened to compress the corprene 135 to the desired amount. Similarly the washer 138 and nut 140 secure the lower ceramic 124. After completing the mechanical and electrical assembly a rigid potting compound 141 is poured to fill the center axial opening in the tubular member 120 for the purpose of consolidating all the loose wires. After completing the assembly a suitable acoustically transparent waterproof jacket 142 is molded to the structure as previously described. For the construction shown in FIG. 11 the two ceramic cylinders 123 and 124 will generate out-of-phase voltages whenever axial mechanical vibrations are imposed on the structure and thereby effectively cancel the mechanically generated noise voltage. For the sound pressure impinging on the element assembly, each cylinder will generate voltages which are in phase and are added together to cause normal operation of the hydrophone.

In each of these, and other applications, the electrical wires may be extended in any suitable manner from the line to associated electronic equipment (not shown). That equipment could include sonar or other sonic location devices, underwater telephony devices, pinging devices, or the like. Moreover, multiple line arrays could be deployed for obtaining horizontal beams. Therefore, the appended claims are intended to cover all embodiments of the inventive line hydrophone and all modifications falling within the true spirit of the invention regardless of the particular application thereof.

I claim:

1. An electroacoustic transducer system comprising a flexible cable containing a plurality of electrical conductors; a plurality of electroacoustic transducer elements spaced along a portion of said flexible cable; means for completing electrical connections between said transducer elements and said electrical conductors contained within said flexible cable means; a cable jacket formed by a plurality of axially aligned, segmented sections integrally molded to form a sound transparent waterproof covering, bonded to, and completely surrounding said transducer elements, said electrical connections, and the electrical conductors to form a waterproof seal between said transducer elements and said flexible cable; and means for causing alternate ones of said transducer elements to generate substantially equal and opposite voltages responsive to a vertical jiggling of said line.

2. The invention of claim 1 wherein a pair of transducer elements are used together in back-to-back relationship at a single location on said line.

3. An electroacoustic transducer system comprising a flexible cable containing a plurality of electrical conductors; a plurality of electroacoustic transducer elements spaced along a portion of said flexible cable; means for completing electrical connections between said transducer elements and said electrical conductors contained within said flexible cable means; and a cable jacket formed by a plurality of axially aligned, segmented sections integrally molded to form a sound transparent waterproof covering, bonded to, and completely surrounding said transducer elements, said electrical connections, and the electrical conductors to form a waterproof seal between said transducer elements and said flexible cable; wherein alternate ones of said transducer elements face in opposite, vertically oriented, directions to discriminate against noise generated by vertical line motion.

4. The assembly of claim 3 wherein each of said transducer elements comprises a stack of polarized piezoelectric plates having a single end surface exposed to the surrounding sound field, and means for directing the end surfaces of alternate ones of said transducers elements in up and down orientation.

5. The method of fabricating a line hydrophone assembly includes the following steps: (1) interconnect a plurality of electroacoustic transducer elements with lengths of insulated electrical conductors, (2) surround the assembly formed by the interconnected transducer elements with a rubber-like material, (3) place said assembly in a suitable mold, and (4) cure said rubber-like material in place to produce a continuous line hydrophone having a number of spaced waterproof electroacoustic transducer elements interconnected by a waterproof continuous jacketed interconnecting spacer member.

6. The method of fabricating a waterproof line hydrophone including the following steps: (1) interconnect a number of electroacoustic transducer elements which are in the form of a hollow cylindrical shell, (2) line the inner wall surface of said cylindrical shell with a layer of low-acoustic-impedance material, (3) fill the space remaining inside the said line cylindrical shell with a solid material, (4) cover the external surfaces of said interconnected structures including the interconnecting lengths of electrical conductors with a layer of uncured rubber-like material, and (5) place said composite assembly in a mold to cure the structure into a line hydrophone assembly having a continuous waterproof jacket.

7. The invention of claim 6 wherein the step (1) comprises orienting adjacent transducer elements to point upwardly or downwardly.

8. The invention of claim 6 wherein the step (1) comprises bonding two of said transducer elements in back-to-back relationship.

9. In combination in an electroacoustic transducer, a rigid support structure having a hollow tubular body portion and an extended peripheral flange portion near the center region of said tubular portion, said extended peripheral flange portion characterized in that its opposite plane faces are parallel and at right angles to the axis of the body portion, transducer means attached to one plane surface of said peripheral flange portion, a second identical transducer means attached to the opposite parallel plane surface of said peripheral flange portion, flexible cable means arranged coaxial with said tubular body member, electrical connection means between both said transducer means and said flexible cable means, and a waterproof jacket surrounding said transducer means and said cable means.

10. The invention in claim 9 further characterized in that said transducer means are polarized ceramic cylinders.

11. The invention in claim 10 characterized in that the opposite unattached ends of said ceramic cylinders are covered with a layer of pressure release material.

12. The invention in claim 11 characterized in that a rigid end cap is placed over each pressure release surface.

13. The invention in claim 12 characterized in that the opposite ends of said tubular body member are threaded and further characterized in that a nut is fastened to each threaded end whereby axial pressure is applied along the axis of each cylinder.

14. The invention in claim 9 characterized in that said electrical connection means pass through the wall of said tubular body structure and further characterized in that the inner hollow chamber of said tubular body structure is filled with a potting compound after said electrical connections are made.

References Cited
UNITED STATES PATENTS

| | | | |
|---|---|---|---|
| 2,864,073 | 12/1958 | Harris | 340—11 X |
| 3,346,841 | 10/1967 | Weichart | 340—17 |

RODNEY D. BENNETT, JR., Primary Examiner

B. L. RIBANO, Assistant Examiner

U.S. Cl. X.R.

340—10